United States Patent
Baharav et al.

(10) Patent No.: US 8,681,035 B2
(45) Date of Patent: Mar. 25, 2014

(54) SYSTEM AND METHOD FOR SECURITY INSPECTION USING MICROWAVE IMAGING

(75) Inventors: Izhak Baharav, Palo Alto, CA (US); Robert C. Taber, Palo Alto, CA (US); Gregory S. Lee, Mountain View, CA (US); John Stephen Kofol, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 2114 days.

(21) Appl. No.: 11/148,079

(22) Filed: Jun. 8, 2005

(65) Prior Publication Data

US 2006/0109160 A1    May 25, 2006

Related U.S. Application Data (63) Continuation of application No. 10/996,764, filed on Nov. 24, 2004, now Pat. No. 6,965,340.

(51) Int. Cl.
*G01S 13/89* (2006.01)
*G01S 13/88* (2006.01)

(52) U.S. Cl.
USPC ............... 342/22; 342/27; 342/59; 342/82; 342/89; 342/175; 342/176; 342/179; 342/195

(58) Field of Classification Search
USPC .............. 340/540, 541, 552, 568.1; 342/22, 342/25 R–25 F, 27, 28, 59, 82–103, 175, 342/176, 179, 188–197, 368–377
See application file for complete search history.

(56) References Cited

U.S. PATENT DOCUMENTS

| | | | |
|---|---|---|---|
| 3,435,453 A | 3/1969 | Dean et al. | |
| 4,502,025 A | 2/1985 | Carl, Jr. et al. | |
| 4,649,393 A | 3/1987 | Rittenbach | |
| 4,885,592 A | 12/1989 | Kofol et al. | |
| 4,910,523 A | 3/1990 | Huguenin | |
| 4,951,058 A * | 8/1990 | Schriner et al. | 342/175 |

(Continued)

FOREIGN PATENT DOCUMENTS

| | | |
|---|---|---|
| EP | 0812028 A2 | 12/1997 |
| GB | 2034554 A | 6/1980 |

(Continued)

OTHER PUBLICATIONS

David M.Sheen et al.; "Three-Dimensional Millimeter-Wave Imaging for Concealed Weapon Detection"; IEEE Transactions on Microwave Theory and Techniques, vol. 49, No. 9, Sep. 2001, pp. 1581-1592.

(Continued)

*Primary Examiner* — Bernarr Gregory (57) ABSTRACT

A microwave imaging system uses microwave radiation provided by a microwave source to image targets. The system includes an array of antenna elements that are capable of being programmed with a respective direction coefficient to direct the microwave illumination from the microwave source toward a position on the target. The antenna elements are further capable of being programmed to receive reflected microwave illumination reflected from the position on the target. A processor is operable to measure an intensity of the reflected microwave illumination to determine a value of a pixel within an image of the target. Multiple beams can be directed towards the target to obtain corresponding pixel values for use by the processor in constructing the image.

21 Claims, 5 Drawing Sheets

(56) References Cited

U.S. PATENT DOCUMENTS

| | | | |
|---|---|---|---|
| 5,027,125 A | 6/1991 | Tang | |
| 5,170,170 A | 12/1992 | Soumekh | |
| 5,365,237 A | 11/1994 | Johnson et al. | |
| 5,455,590 A | 10/1995 | Collins | |
| 5,764,187 A | 6/1998 | Rudish et al. | |
| 5,940,030 A | 8/1999 | Hampel et al. | |
| 5,940,045 A | 8/1999 | Belcher et al. | |
| 5,982,326 A | 11/1999 | Chow et al. | |
| 5,986,590 A | 11/1999 | Smith et al. | |
| 6,037,908 A | 3/2000 | Phillips et al. | |
| 6,043,786 A | 3/2000 | Vannatta et al. | |
| 6,057,761 A | 5/2000 | Yukl | |
| 6,242,740 B1 | 6/2001 | Luukanen et al. | |
| 6,243,036 B1 * | 6/2001 | Chadwick et al. | 342/27 |
| 6,342,696 B1 * | 1/2002 | Chadwick | 342/27 |
| 6,353,224 B1 | 3/2002 | Sinclair et al. | |
| 6,359,582 B1 * | 3/2002 | MacAleese et al. | 342/22 |
| 6,501,414 B2 | 12/2002 | Arndt et al. | |
| 6,549,166 B2 | 4/2003 | Bhattacharyya et al. | |
| 6,642,889 B1 | 11/2003 | McGrath | |
| 6,765,527 B2 * | 7/2004 | Jablonski et al. | 342/193 |
| 6,791,487 B1 * | 9/2004 | Singh et al. | 342/22 |
| 6,825,456 B2 * | 11/2004 | Chadwick et al. | 342/188 |
| 6,856,271 B1 * | 2/2005 | Hausner | 342/22 |
| 6,965,340 B1 * | 11/2005 | Baharav et al. | 342/22 |
| 2003/0034916 A1 | 2/2003 | Kwon et al. | |
| 2004/0056790 A1 | 3/2004 | Lovberg et al. | |
| 2004/0080448 A1 | 4/2004 | Lovberg et al. | |
| 2004/0140924 A1 | 7/2004 | Keller | |

FOREIGN PATENT DOCUMENTS

| | | |
|---|---|---|
| JP | 06252637 A | 9/1994 |
| JP | 09197042 A | 7/1997 |
| JP | 10148673 A | 6/1998 |
| JP | 11017434 A | 1/1999 |
| JP | 2000028712 A | 1/2000 |
| JP | 2000223926 A | 8/2000 |
| JP | 2002514298 A | 5/2002 |
| JP | 2011083996 A | 4/2011 |
| WO | 9007130 A1 | 6/1990 |
| WO | WO 99/21148 A1 | 4/1999 |

OTHER PUBLICATIONS

P.F. Goldsmith, et al.; "Focal Plane Imaging Systems for Millimeter Wavelengths"; IEEE Transactions on Microwave Theory and Techniques, vol. 41, No. 10, Oct. 1993, pp. 1664-1675.

Tatsuo Nozokido, et al.; "Scanning Near-Field Millimeter-Wave Microscopy Using a Metal Slit as a Scanning Probe"; IEEE Transactions on Microwave Theory and Techniques, vol. 49, No. 3, Mar. 2001, pp. 491-499.

EP Application No. 05257070.2 filed Nov. 16, 2005 EP Search Report dated Jun. 5, 2008.

Office Action dated Aug. 21, 2012, Japan Serial No. 2005-337647 filed Nov. 22, 2005.

Office Action dated Jan. 6, 2012, Japan Application No. P2005-336507.

Office Action dated Nov. 9, 2012, Japan Serial No. 2005-336507 filed Nov. 22, 2005.

Office Action dated Jun. 4, 2013, German Application No. 102005050348.9 filed Oct. 20, 2005.

Notice of Allowance dated Aug. 2, 2013, Related Japan Publication No. 2001521157(A) filed Oct. 21, 1998.

Notice of Allowance dated Aug. 2, 2013 in Related Japan Publication No. 2011258329(A) filed Jun. 7, 2010.

* cited by examiner

SYSTEM AND METHOD FOR SECURITY INSPECTION USING MICROWAVE IMAGING

BENEFIT CLAIM UNDER 35 U.S.C. §120

This application is a continuation of U.S. Non-provisional Application for patent Ser. No. 10/996,764 filed on Nov. 24, 2004, now U.S. Pat. No. 6,965,340.

CROSS-REFERENCE TO RELATED APPLICATIONS

This application is related by subject matter to U.S. patent application Ser. No. 10/997,422, filed Nov. 24, 2004, now U.S. Pat. No. 7,224,314, entitled "Device for Reflecting Electromagnetic Radiation" and U.S. patent application Ser. No. 10/997,583, now U.S. Pat. No. 7,724,189, filed Nov. 24, 2004, entitled "Broadband Binary Phased Antenna."

BACKGROUND OF THE INVENTION

In response to an increasing threat of terrorism, inspection of persons and other items for weapons and other types of contraband is becoming essential at security checkpoints, such as those found at airports, concerts, sporting events, courtrooms, federal buildings, schools and other types of public and private facilities potentially at risk from terrorist attacks. Conventional security inspection systems currently in place at security checkpoints include physical inspection, such as visual and/or tactile inspection, performed by security personnel, metal detectors and X-ray systems. However, physical inspection by security personnel is tedious, unreliable and invasive. In addition, metal detectors are prone to false alarms, and are not capable of detecting non-metallic objects, such as plastic or liquid explosives, plastic or ceramic handguns or knives and drugs. Furthermore, X-ray systems pose a health risk, particularly to those people who are repeatedly exposed to X-ray radiation, such as airport personnel, and X-ray systems also are not able detect certain materials/geometries, such as ceramic knives.

As a result of the need for improved security inspection systems, various microwave imaging systems have been proposed as an alternative to existing systems. Microwave radiation is generally defined as electromagnetic radiation having wavelengths between radio waves and infrared waves. An advantage of microwave radiation over X-ray radiation is that microwave radiation is non-ionizing, and therefore, poses no known health risks to people at moderate power levels. In addition, over the spectral band of microwave radiation, most dielectric materials, such as clothing, paper, plastic and leather are nearly transparent. Therefore, microwave imaging systems have the ability to penetrate clothing to image items concealed by clothing.

At present, there are several microwave imaging techniques available. For example, one technique uses an array of microwave detectors to capture either passive microwave energy emitted by the target or reflected microwave energy reflected from the target in response to active microwave illumination of the target. A two-dimensional or three-dimensional image of a person or other item is constructed by scanning (moving) the array of detectors with respect to the item's position and/or adjusting the frequency (or wavelength) of the microwave energy being transmitted or detected. For example, an article by David M. Sheen et al., "Three-Dimensional Millimeter-Wave Imaging for Concealed Weapon Detection," IEEE Transactions on Microwave Theory and Techniques, Vol. 49, No. 9, September 2001, pp. 1581-1592 describes a three-dimensional holographic microwave imaging technique that uses a scanning bar to mechanically move a linear array of detectors to scan an item or person. The resulting measured data is used to reconstruct a holographic image of the item. However, such scanning systems typically require mechanically moving parts and/or intensive post-processing reconstruction of the image, both of which increase the cost and complexity of the microwave imaging system.

Another technique uses lenses to focus a beam of microwave illumination on the array of microwave detectors. This type of technique is described, for example, in the article P. F. Goldsmith, et al., "Focal Plane Imaging Systems for Millimeter Wavelengths," IEEE Transactions on Microwave Theory and Techniques, Vol. 41, No. 10, October 1993, pp. 1664-1675. However, microwave imaging systems that use lenses to focus the microwave energy typically have a limited field of view and small aperture size. In addition, the cost of the lens system may be prohibitively large in many applications.

Therefore, what is needed is a cost-effective and simple microwave imaging system for use in security inspection of persons or other items that does not require any moving parts.

SUMMARY OF THE INVENTION

Embodiments of the present invention provide a microwave imaging system that uses microwave radiation to image targets. The system includes a microwave source for providing microwave illumination and an array of antenna elements that are capable of being programmed with a respective direction coefficient to direct the microwave illumination from the microwave source toward a position on the target. The antenna elements are further capable of being programmed to receive reflected microwave illumination reflected from the position on the target. A processor is operable to measure an intensity of the reflected microwave illumination to determine a value of a pixel within an image of the target. Multiple beams can be directed towards the target to obtain corresponding pixel values for use by the processor in constructing the image.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

As used herein, the terms microwave radiation and microwave illumination each refer to the band of electromagnetic radiation having wavelengths between 0.3 mm and 30 cm, corresponding to frequencies of about 1 GHz to about 1,000 GHz. Thus, the terms microwave radiation and microwave illumination each include traditional microwave radiation, as well as what is commonly known as millimeter-wave radiation.

Figure 1:
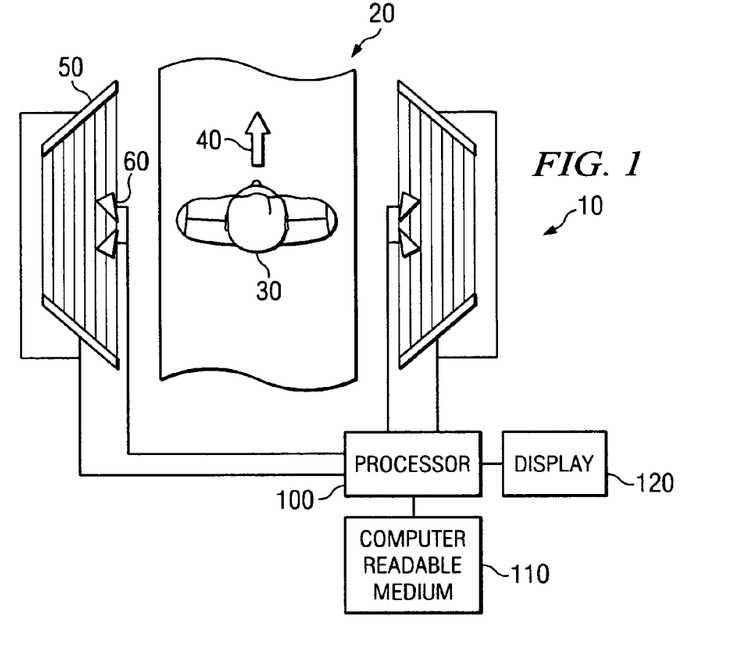
FIG. 1 is a schematic diagram of a simplified exemplary microwave security inspection system, in accordance with embodiments of the present invention.

FIG. 1 is a schematic diagram of a simplified exemplary microwave security inspection system 10, in accordance with embodiments of the present invention. The microwave security inspection system 10 includes a portal 20 through which a human subject 30 is capable of walking. The portal 20 does not include any moving parts, and therefore, the human subject 30 is able to walk at a normal pace in a single direction 40 through the portal 20. By enabling the human subject 30 to walk through the portal 20, the throughput of the system 10 is maximized, while also minimizing the inconvenience to the human subject 30. In other embodiments, the portal 20 is an area through which an item, such as luggage, a purse, a briefcase, a laptop, a bag or other type of item, may pass. The item may be placed in the portal 20 or pass through the portal 20 on a conveyor belt.

The microwave security inspection system 10 further includes one or more scanning panels 50 and one or more microwave antennas 60. Each of the microwave antennas 60 is capable of transmitting microwave radiation and/or receiving microwave radiation. In one embodiment, one or more of the scanning panels 50 includes a passive programmable reflector array composed of reflecting antenna elements. Each of the reflecting antenna elements is capable of being programmed with a respective phase delay to direct microwave illumination towards the human subject 30 and/or towards one of the microwave antennas 60. The phase delay can be either binary or continuous.

For example, in one embodiment, one of the microwave antennas 60 is a receiving microwave antenna 60 positioned at a predetermined spatial location. Microwave illumination received by one of the scanning panels 50 from a target position on the human subject 20 is reflected towards the receiving microwave antenna 60 by programming each of the individual reflecting antenna elements with a respective phase delay. The transmitting microwave antenna 60 can be positioned either in the same spatial location as the receiving microwave antenna 60 as a separate antenna or as part of the receiving microwave antenna, and illuminate the target position through the scanning panel 50, or can be positioned at a different spatial location from the receiving microwave antenna 60 and either illuminate the target position on the human subject 30 directly or through one of the scanning panels 50 (e.g., the same scanning panel 50 as the receiving microwave antenna 60 or a different scanning panel 50).

In another embodiment, one or more of the scanning panels 50 includes an active transmitter/receiver array composed of active antenna elements capable of producing and transmitting microwave illumination and receiving and capturing reflected microwave illumination. For example, the active array may be in the form of a transmission array. In this embodiment, microwave antennas 60 are not used, as the scanning panels 50 operate as the source of microwave radiation. Each of the active antenna elements in the active transmitter/receiver array is individually programmable with a respective phase shift to steer a beam of microwave illumination towards a target position on the human subject 30.

The microwave imaging system 10 further includes a processor 100, computer-readable medium 110 and a display 120. The processor 100 includes any hardware, software, firmware, or combination thereof for controlling the scanning panels 50 and microwave antennas 60 and processing the received microwave illumination reflected from the human subject 30 to construct a microwave image of the human subject 30. For example, the processor 100 may include one or more microprocessors, microcontrollers, programmable logic devices, digital signal processors or other type of processing devices that are configured to execute instructions of a computer program, and one or more memories (e.g., cache memory) that store the instructions and other data used by the processor 100. However, it should be understood that other embodiments of the processor 100 may be used. The memory 110 is any type of data storage device, including but not limited to, a hard drive, random access memory (RAM), read only memory (ROM), compact disc, floppy disc, ZIP® drive, tape drive, database or other type of storage device or storage medium.

The processor 100 operates to program the phase delays or phase shifts of each of the individual antenna elements in the scanning panels 50 to illuminate multiple target positions on the human subject 30 with microwave radiation and/or receive reflected microwave illumination from multiple target positions on the human subject 30. Thus, the processor 100 in conjunction with the scanning panels 50 operates to scan the human subject 30.

The processor 100 is further capable of constructing a microwave image of the human subject 30 using the intensity of the reflected microwave illumination received by the receiving microwave antennas 60 from each target position on the human subject 30. Each receiving microwave antenna 60 is capable of combining the reflected microwave illumination reflected from each antenna element in one of the scanning panels 50 to produce a value of the effective intensity of the reflected microwave illumination at the target position on the human subject 30. The intensity value is passed to the processor 110, which uses the intensity value as the value of a pixel corresponding to the target position on the human subject 30.

The processor 100 receives multiple intensity values from each of the receiving microwave antennas 60, and combines the intensity values to produce the microwave image of the human subject 30. For example, the processor 100 associates a received intensity value with a target position on the human subject and populates the value of a pixel in the microwave image with the received intensity value. The location of the populated pixel in the microwave image corresponds to the target position on the human subject 30. In operation, the microwave security inspection system 10 can operate at frequencies that enable millions of target positions on the human subject 30 to be scanned per second.

The resulting microwave image of the human subject 30 can be passed from the processor 100 to the display 120 to display the microwave image of the human subject 30. In one embodiment, the display 120 is a two-dimensional display for displaying a three-dimensional microwave image of the human subject 30 or one or more two-dimensional microwave images of the human subject 30. In another embodiment, the display 120 is a three-dimensional display capable of displaying a three-dimensional microwave image of the human subject 30.

Figure 2:
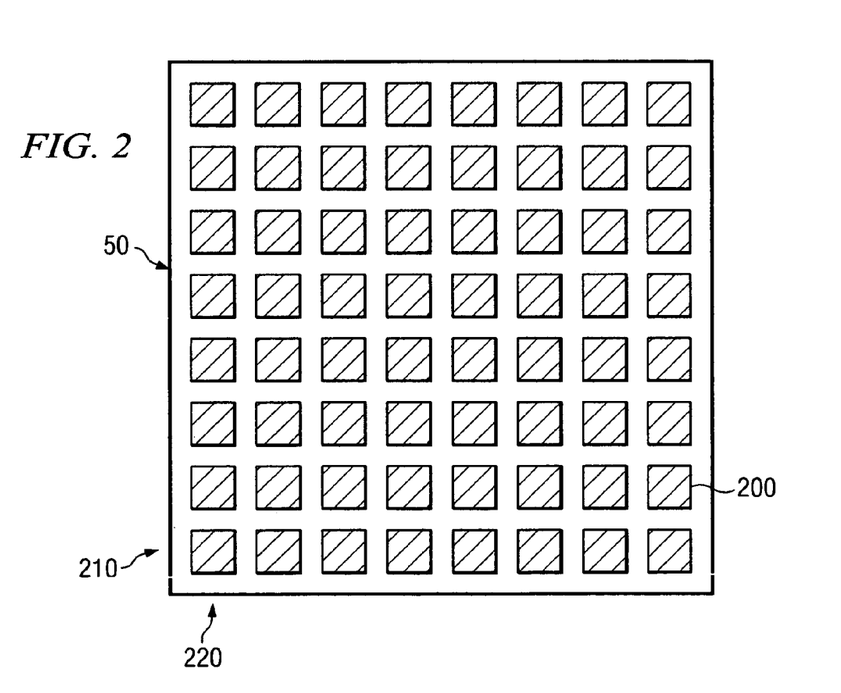
FIG. 2 is a schematic diagram of a simplified exemplary scanning panel for use in the inspection system of FIG. 1, in accordance with embodiments of the present invention.

FIG. 2 is a schematic diagram of a simplified exemplary scanning panel 50 for use in the inspection system of FIG. 1, in accordance with embodiments of the present invention.

The scanning panel 50 in FIG. 2 is a reflector antenna array that includes distinct reflecting antenna elements 200 that reflect electromagnetic radiation with varying phase depending on their impedance state, as described in U.S. Pat. No. 7,224,314. Ideally, the reflecting antenna elements 200 reflect electromagnetic radiation with a phase shift of 180 degrees (binary phase-shifted) when their impedance is high relative to when their impedance is low. The reflecting antenna elements 200 are individually controllable and the reflector antenna array is typically supported by driver electronics (not shown in FIG. 2). The reflector antenna array is formed on and/or in a substrate, such as a printed circuit board. In one example, the reflector antenna array has a surface area of approximately one meter square and is covered with 10,000 to 100,000 individually controllable reflecting antenna elements 200 arranged in rows 210 and columns 220.

Each reflecting antenna element 200 includes an antenna and a non-ideal switching device. The antenna functions to absorb or reflect a beam of electromagnetic radiation to varying degrees depending on the impedance level of the reflecting antenna element 200. Example antenna types that can be incorporated into a reflector antenna array include patch, dipole, monopole, loop, and dielectric resonator type antennas. In reflector antenna array applications, the antennas are often formed in a single plane on the surface of the reflector antenna array substrate. The antennas have an impedance characteristic that is a function of the antenna design parameters. Design parameters of antennas include but are not limited to, physical attributes such as the dielectric material of construction, the thickness of the dielectric material, shape of the antenna, length and width of the antenna, feed location, and thickness of the antenna metal layer.

The non-ideal switching device changes the impedance state of the reflecting antenna element 200 by changing its resistive state. A low resistive state (e.g., a closed or "short" circuit) translates to a low impedance. Conversely, a high resistive state (e.g., an open circuit) translates to a high impedance. A switching device with ideal performance characteristics (referred to herein as an "ideal" switching device) produces effectively zero impedance ($Z=0$) when its resistance is at its lowest state and effectively infinite impedance ($Z=\infty$) when its resistance is at its highest state. As described herein, a switching device is "on" when its impedance is at its lowest state (e.g., $Z_{on}=0$) and "off" when its impedance is at its highest state (e.g., $Z_{off}=\infty$). Because the on and off impedance states of an ideal switching device are effectively $Z_{on}=0$ and $Z_{off}=\infty$, an ideal switching device is able to provide the maximum phase shift without absorption of electromagnetic radiation between the on and off states. That is, the ideal switching device is able to provide switching between 0 and 180 degree phase states. In the case of an ideal switching device, maximum phase-amplitude performance can be achieved with an antenna that exhibits any finite non-zero impedance.

In contrast to an ideal switching device, a "non-ideal" switching device is a switching device that does not exhibit on and off impedance states of $Z_{on}=0$ and $Z_{off}=\infty$), respectively. Rather, the on and off impedance states of a non-ideal switching device are, for example, somewhere between $Z_{on}=0$ and $Z_{off}=4$. A non-ideal switching device may exhibit ideal impedance characteristics within certain frequency ranges (e.g., <10 GHz) and highly non-ideal impedance characteristics at other frequency ranges (e.g., >20 GHz).

Because the on and off impedance states of a non-ideal switching device are somewhere between $Z_{on}=0$ and $Z_{off}=4$, the non-ideal switching device does not necessarily provide the maximum phase state performance regardless of the impedance of the corresponding antenna, where maximum phase state performance involves switching between 0 and 180 degree phase states. In accordance with the invention, the antennas of a reflector antenna array that utilizes non-ideal switching devices are specifically designed to provide optimal phase performance, where the optimal phase state performance of a reflecting antenna element is the point at which the reflecting element is closest to switching between 0 and 180 degree phase-amplitude states. In an embodiment, to achieve optimal phase state performance, the antennas are configured as a function of the impedance of the non-ideal switching devices. For example, the antennas are designed such that the impedance of the antennas is a function of impedance characteristics of the non-ideal switching devices.

Further, the antennas are configured as a function of the impedance of the non-ideal switching devices in the on state, $Z_{on}$, and the impedance of the non-ideal switching device in the off state, $Z_{off}$. In a particular embodiment, the phase state performance of a reflecting element is optimized when the antennas are configured such that the impedance of each antenna is conjugate to the square root of the impedance of the non-ideal switching devices when in the on and off impedance states, $Z_{on}$ and $Z_{off}$. Specifically, the impedance of each antenna is the complex conjugate of the geometric mean of the on and off impedance states, $Z_{on}$ and $Z_{off}$ of the corresponding non-ideal switching device. This relationship is represented as:

$$Z_{antenna}^* = \sqrt{Z_{on}Z_{off}} \tag{1}$$

The above-described relationship is derived using the well-known formula for the complex reflection coefficient between a source impedance and a load impedance. Choosing the source to be the antenna and the load to be the non-ideal switching device, the on-state reflection coefficient is set to be equal to the opposite of the off-state reflection coefficient to arrive at equation (1).

Designing an antenna that exhibits optimal phase-amplitude performance involves determining the on and off impedances, $Z_{on}$ and $Z_{off}$ of the particular non-ideal switching device that is used in the reflecting antenna elements 200. Design parameters of the antenna are then manipulated to produce an antenna with an impedance that matches the relationship expressed in equation (1) above. An antenna that satisfies equation (1) can be designed as long as $Z_{on}$ and $Z_{off}$ are determined to be distinct values.

Types of switching devices that exhibit non-ideal impedance characteristics over the frequency band of interest include low cost surface mount devices such as surface mount field effect transistors (FETs) and surface mount diodes. Although surface mount FETs exhibit non-ideal impedance characteristics over the frequency band of interest, they are relatively inexpensive and can be individually packaged for use in reflector antenna array applications.

Figure 3:
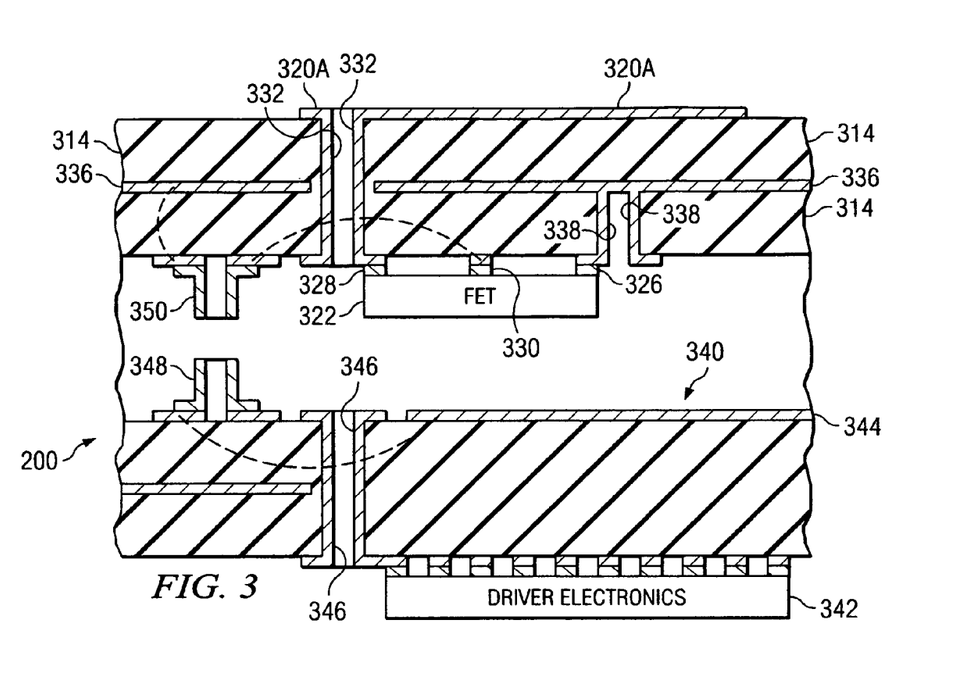
FIG. 3 is a cross-sectional view of an antenna element of the scanning panel of FIG. 2, in accordance with embodiments of the present invention.

In an embodiment, the antennas in the reflector antenna array are planar patch antennas. FIG. 3 is a cross-sectional view of an antenna element 200 that utilizes a planar patch antenna 320a with a surface mounted FET 322 as the non-ideal switching device, in accordance with embodiments of the present invention. The reflecting antenna element 200 is formed on and in a printed circuit board substrate 314 and includes the surface mounted FET 322, a patch antenna 320a, a drain via 332, a ground plane 336 and a source via 338. The surface mounted FET 322 is mounted on the opposite side of the printed circuit board substrate 314 as the planar patch antenna 320a and the ground plane 336 is located between the planar patch antenna 320a and the surface mounted FET 322. The drain via 332 connects the drain 328 of the surface mounted FET 322 to the planar patch antenna 320a and the source via 338 connects the source 326 of the surface mounted FET 322 to the ground plane 336. In one embodiment, the surface mounted FETs 322 are placed on the printed circuit board substrate 314 using a robotic "pick and place" process and then wave soldered to the printed circuit board 314.

In a working product, the reflector antenna array is connectable to a controller board 340 that includes driver electronics. An example controller board 340 is also depicted in FIG. 3 and includes a ground plane 344, a drive signal via 346, and driver electronics 342. The controller board 340 also includes connectors 348 that are compatible with connectors 350 of the reflector antenna array. The connectors 348 of the two boards can be connected to each other, for example, using wave soldering. It should be understood that in other embodiments, the FET 322 can be surface mounted on the same side of the printed circuit board substrate 314 as the planar patch antenna 320a. Additionally, the driver electronics 342 can be soldered directly to the same printed circuit board in which the reflecting antenna element 200 is built.

In a reflector antenna array that utilizes FETs as the non-ideal switching devices, the beam-scanning speed that can be achieved depends on a number of factors including signal-to-noise ratio, crosstalk, and switching time. In the case of a FET, the switching time depends on gate capacitance, drain-source capacitance, and channel resistance (i.e., drain-source resistance). The channel resistance is actually space-dependent as well as time-dependent. In order to minimize the switching time between impedance states, the drain of the FET is DC-shorted at all times. The drain is DC-shorted at all times because floating the drain presents a large off-state channel resistance as well as a large drain-source capacitance due to the huge parallel-plate area of the patch antenna. This implies that the antenna is DC-shorted but one wishes the only "rf short" the antenna sees be at the source. Therefore, the additional antenna/drain short must be optimally located so as to minimally perturb the antenna.

In other embodiments, the reflector antenna array can include continuous phase-shifted antenna elements 200 by replacing the FETs with variable capacitors (e.g., Barium Strontium Titanate (BST) capacitors). With the variable capacitor loaded patches, continuous phase shifting can be achieved for each antenna element 200, instead of the binary phase shifting produced by the FET loaded patches. Continuous phased arrays can be adjusted to provide any desired phase shift in order to steer a microwave beam towards any direction in a beam scanning pattern.

In further embodiments, the scanning panel is an active transmit/receive array including active antenna elements.

Figure 12:
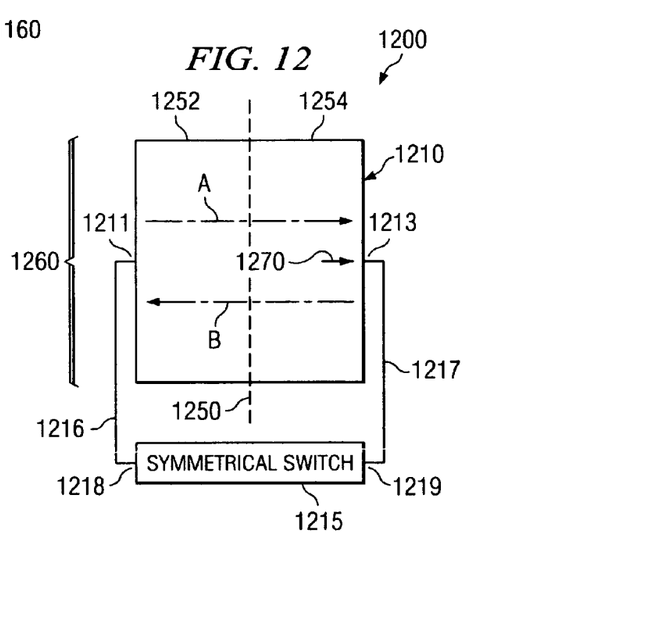
FIG. 12 illustrates an exemplary active antenna element for use in an transmit/receive array.

An example of an active antenna element 1200 for use in a transmit/receive array is shown in FIG. 12 and described in and commonly assigned U.S. patent application Ser. No. 10/997,583, now U.S. Pat. No. 7,724,189. The active antenna element 1200 is a broadband binary phased antenna element including an antenna 1210 connected to a respective switch 1215. The switch 1215 can be, for example, a single-pole double-throw (SPDT) switch or a double-pole double-throw (DPDT) switch. The operating state of the switch 1215 controls the phase of the respective antenna element 1200. For example, in a first operating state of the switch 1215, the antenna element 1200 may be in a first binary state (e.g., 0 degrees), while in a second operating state of the switch 1215, the antenna element 1200 may be in a second binary state (e.g., 180 degrees). The operating state of the switch 1215 defines the terminal connections of the switch 1215. For example, in the first operating state, terminal 1218 may be in a closed (short circuit) position to connect feed line 1216 between the antenna 1210 and the switch 1215, while terminal 1219 may be in an open position. The operating state of each switch 1215 is independently controlled by a control circuit (not shown) to individually set the phase of each antenna element 1200.

As used herein, the term symmetric antenna 1210 refers to an antenna that can be tapped or fed at either of two feed points 1211 or 1213 to create one of two opposite symmetric field distributions or electric currents. As shown in FIG. 12, the two opposite symmetric field distributions are created by using a symmetric antenna 1210 that is symmetric in shape about a mirror axis 1250 thereof. The mirror axis 1250 passes through the antenna 1210 to create two symmetrical sides 1252 and 1254. The feed points 1211 and 1213 are located on either side 1252 and 1254 of the mirror axis 1250 of the antenna 1210. In one embodiment, the feed points 1211 and 1213 are positioned on the antenna 1210 substantially symmetrical about the mirror axis 1250. For example, the mirror axis 1250 can run parallel to one dimension 1260 (e.g., length, width, height, etc.) of the antenna 1210, and the feed points 1211 and 1213 can be positioned near a midpoint 1270 of the dimension 1260. In FIG. 12, the feed points 1211 and 1213 are shown positioned near a midpoint 1270 of the antenna 1210 on each side 1252 and 1254 of the mirror axis 1250.

The symmetric antenna 1210 is capable of producing two opposite symmetric field distributions, labeled A and B. The magnitude (e.g., power) of field distribution A is substantially identical to the magnitude of field distribution B, but the phase of field distribution A differs from the phase of field distribution B by 180 degrees. Thus, field distribution A resembles field distribution B at ±180° in the electrical cycle.

The symmetric antenna 1210 is connected to the symmetric switch 1215 via feed lines 1216 and 1217. Feed point 1211 is connected to terminal 1218 of the symmetric switch 1215 via feed line 1216, and feed point 1213 is connected to terminal 1219 of the symmetric switch 1215 via feed line 1217. As used herein, the term symmetric switch refers to either a SPDT or DPDT switch in which the two operating states of the switch are symmetric about the terminals 1218 and 1219.

For example, if in a first operating state of a SPDT switch, the impedance of channel α is 10Ω and the impedance of channel β is 1 kΩ, then in the second operating state of the SPDT switch, the impedance of channel α is 1 kΩ and the impedance of channel β is 10Ω. It should be understood that the channel impedances are not required to be perfect opens or shorts or even real. In addition, there may be crosstalk between the channels, as long as the crosstalk is state-symmetric. In general, a switch is symmetric if the S-parameter matrix of the switch is identical in the two operating states of the switch (e.g., between the two terminals 1218 and 1219).

It should be understood that other types of antenna elements and scanning panels may be used to transmit, receive and/or reflect microwave illumination to and from a human subject or other item being scanned. In addition, it should be understood that multiple scanning panels may be used to scan different portions of the human subject or other item. For example, the microwave security inspection system can be implemented with two scanning panels, each including a 1 m×1 m array of antenna elements to scan half of a human subject. As another example, the microwave security inspection system can be implemented with four scanning panels, each including a 0.5 m×0.5 m array of antenna elements capable of scanning a quadrant of the human subject.

Figure 4:
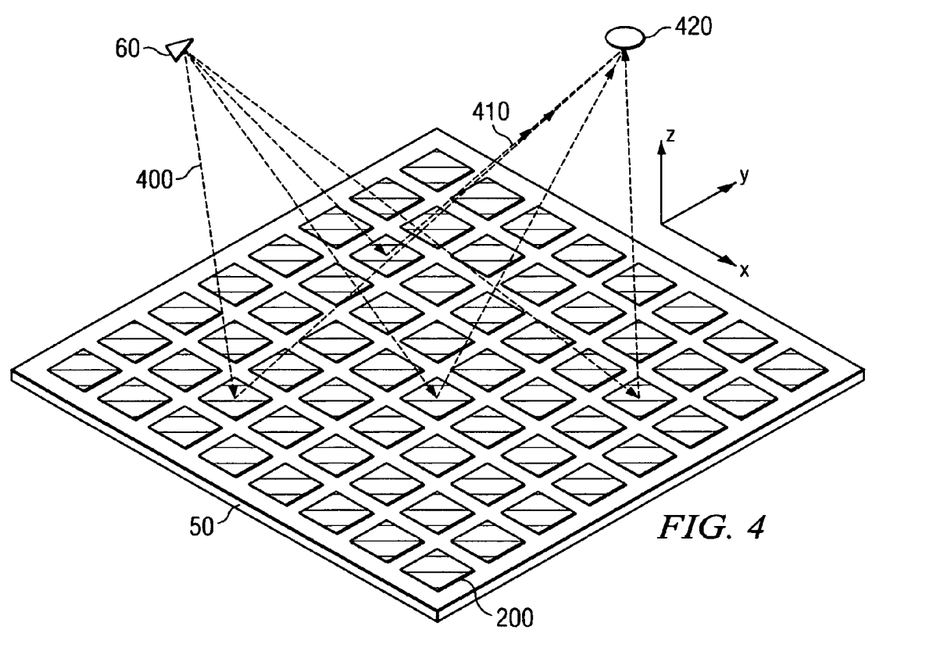
FIG. 4 is a schematic diagram of a top view of an exemplary scanning panel for reflecting microwave illumination, in accordance with embodiments of the present invention.

FIG. 4 is a schematic diagram of a top view of an exemplary scanning panel 50 for reflecting microwave illumination, in accordance with embodiments of the present invention.

In FIG. 4, microwave illumination 400 transmitted from a microwave antenna 60 is received by various antenna elements 200 in the scanning panel 50. The antenna elements 200 are each programmed with a respective phase delay to direct reflected microwave illumination 410 towards a target 420. The phase delays are selected to create positive interference of the reflected microwave illumination 410 from each of the antenna elements 200 at the target 420. Ideally, the phase shift of each of the antenna elements 200 is adjusted to provide the same phase delay for each path of the reflected microwave illumination 410 from the source (antenna element 200) to the target 420.

Figure 5:
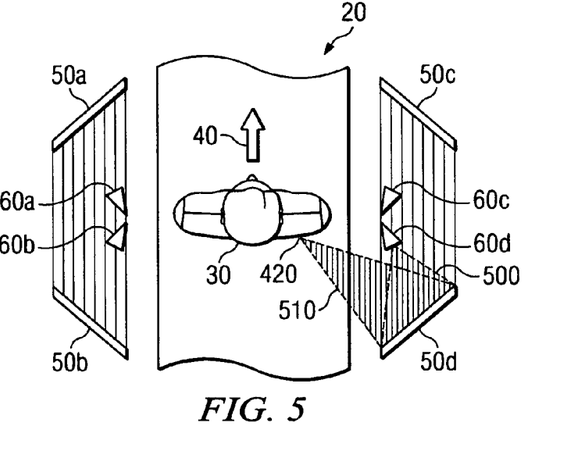
FIG. 5 is a schematic diagram of an exemplary microwave security inspection system illuminating a target on a human subject, in accordance with embodiments of the present invention.

FIG. 5 is a schematic diagram of an exemplary microwave security inspection system 10 illuminating a target 420 on a human subject 30, in accordance with embodiments of the present invention. The microwave inspection system 10 is shown including four scanning panels 50*a*, 50*b*, 50*c* and 50*d* and four microwave antennas 60*a*, 60*b*, 60*c* and 60*d*. To address a particular point (target 420) on the human subject 30, microwave illumination 500 is radiated from a particular microwave antenna (e.g., microwave antenna 60*d*) towards a particular scanning panel (e.g., scanning panel 50*d*). The antenna elements in the scanning panel 50*d* are each programmed with a respective phase delay to reflect the microwave illumination 500 and direct reflected microwave illumination 510 towards the target 420. This phase delay will also insure the focusing of the reflected wave from the target 420 toward the receiving antenna 60*d*.

Figure 6:
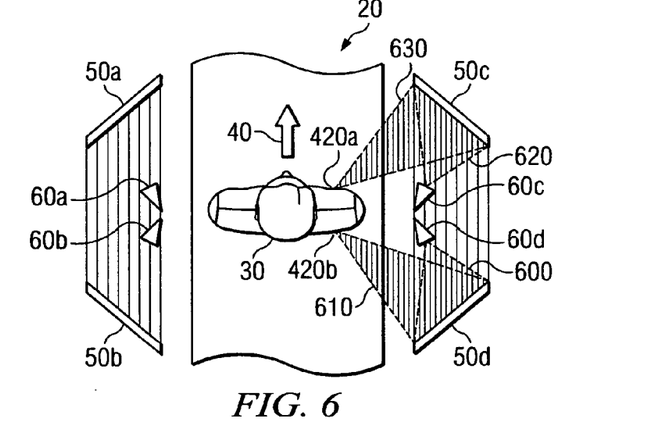
FIG. 6 is a schematic diagram of an exemplary microwave security inspection system illuminating multiple targets on a human subject, in accordance with embodiments of the present invention.

FIG. 6 is a schematic diagram of an exemplary microwave security inspection system 10 illuminating multiple targets 420*a* and 420*b* on a human subject 30, in accordance with embodiments of the present invention. In FIG. 6, microwave illumination 620 is radiated from a particular microwave antenna (e.g., microwave antenna 60*c*) towards a particular scanning panel (e.g., scanning panel 50*c*). The antenna elements in the scanning panel 50*c* are each programmed with a respective phase delay to reflect the microwave illumination 620 and direct reflected microwave illumination 630 towards a particular target 420*a*. In addition, microwave illumination 600 is radiated from a particular microwave antenna (e.g., microwave antenna 60*d*) towards a particular scanning panel (e.g., scanning panel 50*d*). The antenna elements in the scanning panel 50*d* are each programmed with a respective phase delay to reflect the microwave illumination 600 and direct reflected microwave illumination 610 towards a particular target 420*b*. In addition, although not specifically shown, the antenna elements within each scanning panel 50*c* and 50*d* can be interleaved such as to direct microwave illumination reflected from the targets 420*a* and 420*b* towards the respective microwave antennas 60*c* and 60*d*. By operating more than one scanning panel 50*a*-50*d* at a time, time multiplexing can be achieved.

Figure 7:
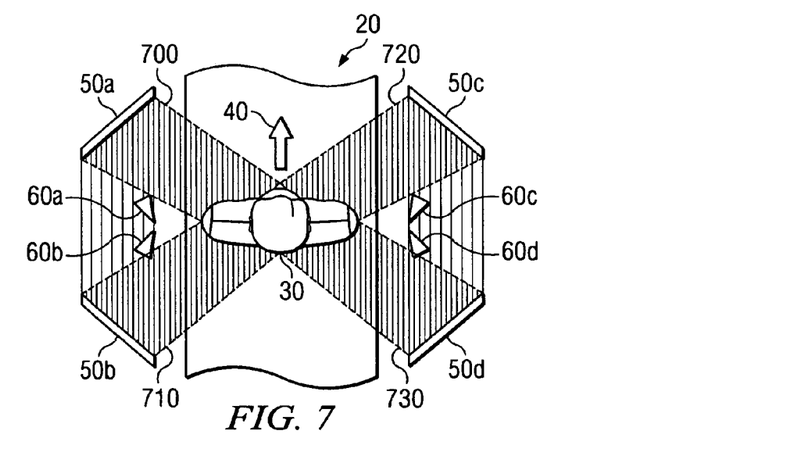
FIG. 7 is a schematic diagram illustrating the coverage area of each scanning panel in the exemplary microwave security inspection system, in accordance with embodiments of the present invention.

FIG. 7 is a schematic diagram illustrating an exemplary coverage area 700, 710, 720 and 730 of each scanning panel 50*a*, 50*b*, 50*c* and 50*d*, respectively, in the exemplary microwave security inspection system 10, in accordance with embodiments of the present invention. The coverage area 700, 710, 720 and 730 of each scanning panel 50*a*, 50*b*, 50*c* and 50*d*, respectively, encompasses a different portion of the human subject 30. For example, as shown in FIG. 7, the human subject 30 is divided into quadrants, and the coverage area 700, 710, 720 and 730 of each scanning panel 50*a*, 50*b*, 50*c* and 50*d*, respectively, includes one of the quadrants. Thus, time multiplexing of the microwave image is accomplished by simultaneously operating each scanning panel 50*a*, 50*b*, 50*c* and 50*d* to scan all of the quadrants of the human subject 30. In addition to or in lieu of time multiplexing, each scanning panel 50*a*-50*d* and each microwave antenna 60*a*-60*d* can also be programmed to accommodate frequency multiplexing in order to simultaneously scan multiple targets in one quadrant of the human subject 30 using different frequencies.

Figure 8:
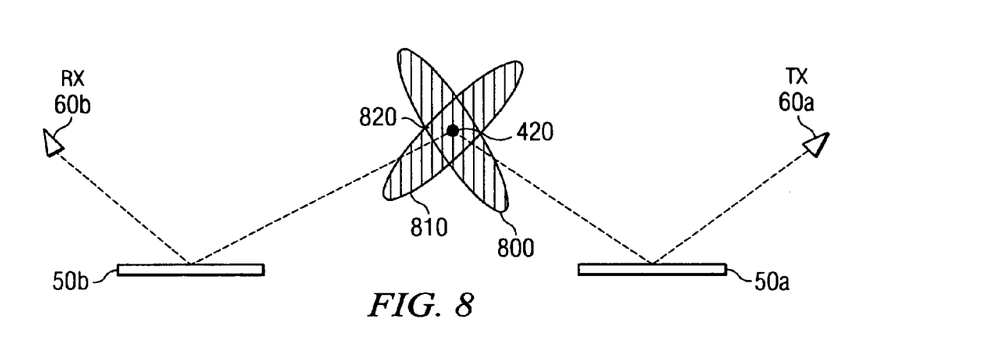
FIG. 8 is a pictorial representation of various potential beams of microwave illumination produced by the microwave security inspection system, in accordance with embodiments of the present invention.

FIG. 8 is a pictorial representation of various potential beams of microwave illumination produced by the microwave security inspection system, in accordance with embodiments of the present invention. Each scanning panel 50*a* and 50*b* produces a radiation pattern 800 and 810, respectively, of microwave illumination at a target 420. Each radiation pattern 800 and 810 represents a beam of microwave illumination having a particular beam width that determines the resolution of the image, where large beam widths produce poor resolution. The beam width is dependent on the wavelength of the microwave illumination and the size and programming of each scanning panel 50*a* and 50*b*.

To improve the resolution of the microwave image, different scanning panels 50*a* and 50*b* and different microwave antennas 60*a* and 60*b* can be used for transmitting and receiving. For example, as shown in FIG. 8, microwave antenna 60*a* is a transmitting microwave antenna and microwave antenna 60*b* is a receiving microwave antenna. The transmitting microwave antenna 60*a* transmits microwave illumination towards the scanning panel 50*a*. The scanning panel 50*a*, in turn, reflects the microwave illumination towards the target 420 as a beam 800 of microwave illumination. The microwave illumination reflected from the target 420 is received as a beam 820 of microwave illumination by the scanning panel 50*b* and reflected towards the receiving microwave antenna 60*b*. Using knowledge of the beam width of each microwave beam 800 and 810, the resolution of the microwave image can be reduced to the intersection (or multiplication) 820 of the two radiation patterns 800 and 810.

Figure 9:
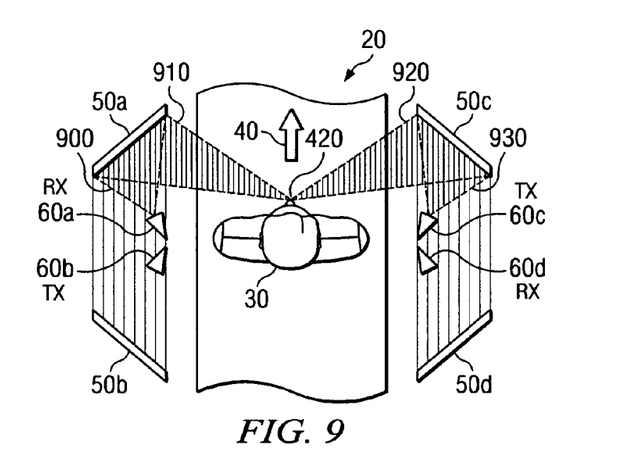
FIG. 9 is a schematic diagram illustrating the usage of different microwave antennas and scanning panels for transmission and reception, in accordance with embodiments of the present invention.

FIG. 9 is a schematic diagram illustrating the usage of different microwave antennas and scanning panels for transmission and reception, in accordance with embodiments of the present invention. In FIG. 9, microwave antenna 60*a* is used as the transmitting microwave antenna and microwave antenna 60*c* is used as the receiving microwave antenna to image a target 420 on the front of the human subject 30. The transmitting microwave antenna 60*a* transmits microwave illumination 900 towards the scanning panel 50*a*. The scanning panel 50*a*, in turn, reflects the microwave illumination towards the target 420 as a beam 910 of microwave illumination. The microwave illumination reflected from the target 420 is received as a beam 920 of microwave illumination by the scanning panel 50*c* and reflected towards the receiving microwave antenna 60*c*.

Figure 10:
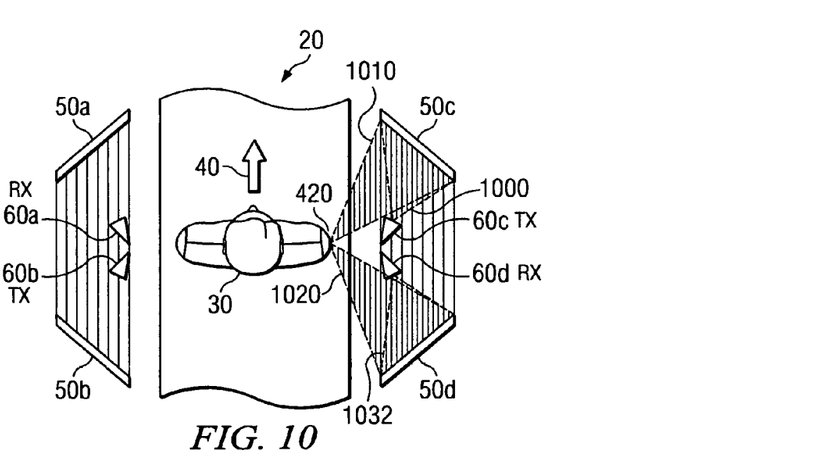
FIG. 10 is a schematic diagram illustrating the usage of other microwave antennas and scanning panels for transmission and reception, in accordance with embodiments of the present invention.

FIG. 10 is a schematic diagram illustrating the usage of other microwave antennas and scanning panels for transmission and reception, in accordance with embodiments of the present invention. In FIG. 10, microwave antenna 60*c* is used as the transmitting microwave antenna and microwave antenna 60*d* is used as the receiving microwave antenna to image a target 420 on the side of the human subject 30. The transmitting microwave antenna 60*c* transmits microwave illumination 1000 towards the scanning panel 50*c*. The scanning panel 50*c*, in turn, reflects the microwave illumination towards the target 420 as a beam 1010 of microwave illumination. The microwave illumination reflected from the target 420 is received as a beam 1020 of microwave illumination by the scanning panel 50*d* and reflected towards the receiving microwave antenna 60*d*.

Figure 11:
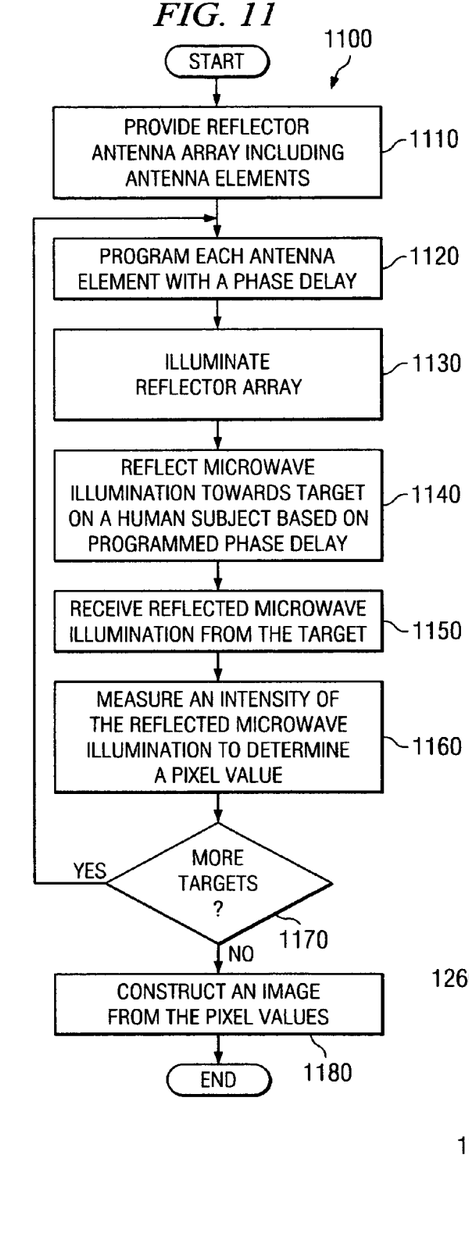
FIG. 11 is a flow chart illustrating an exemplary process for performing microwave security inspection of a human subject or other item, in accordance with embodiments of the present invention.

FIG. 11 is a flow chart illustrating an exemplary process 1100 for performing microwave security inspection of a human subject or other item, in accordance with embodiments of the present invention. Initially, a reflector antenna array including a plurality of antenna elements is provided at block 1110. At block 1120, each of the antenna elements is programmed with a respective phase delay. Thereafter, the reflector antenna array is illuminated with microwave radiation by a microwave source at block 1130, and reflects the microwave illumination towards a target on a human subject or other item based on the programmed phase delays of each of the antenna elements at block 1140. At block 1150, the reflector antenna array receives microwave illumination reflected from the target on the human subject or other item.

At block 1160, the intensity of the reflected microwave illumination received at the reflector antenna array from the target on the human subject or item is measured to determine the value of a pixel within an image of the human subject or item. If there are more targets on the human subject or item to scan at block 1170, the antenna elements are re-programmed with new respective phase delays to reflect microwave illumination towards a new target on the human subject or item at block 1120. Once all of the targets on the human subject or item have been scanned, at block 1180, a microwave image of the human subject or item is constructed from the measured pixel values at each target (point) on the human subject or item.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A microwave imaging system, comprising:
   a microwave source for providing microwave illumination;
   an antenna array including a plurality of antenna elements, each of said antenna elements operable to be programmed with a respective reflection coefficient to direct said microwave illumination towards a position on a target, said antenna elements being further operable to be programmed to receive reflected microwave illumination reflected from said position on said target; and
   a processor operable to measure an intensity of said reflected microwave illumination to determine a value of a pixel within an image of said target constructed by said processor.

2. The system of claim 1, wherein said microwave source is configured to blanket illuminate said target with said microwave illumination.

3. The system of claim 2, wherein said antenna array is configured to receive said reflected microwave illumination reflected from said position on the target and direct said reflected microwave illumination towards a microwave receiver based on said respective direction coefficient associated with each of said antenna elements.

4. The system of claim 1, wherein said antenna array is configured to receive said microwave illumination from said microwave source and direct said microwave illumination towards said position on the target based on said respective direction coefficient associated with each of said antenna elements.

5. The system of claim 4, further comprising:
   a microwave receiver operable to blanket receive said reflected microwave illumination reflected from said position on said target.

6. The system of claim 1, wherein each said reflection coefficient represents a phase state of said respective antenna element.

7. The system of claim 1, wherein each said reflection coefficient represents an amplitude state of said respective antenna element.

8. A method for microwave imaging of a target, comprising:
   providing an antenna array including a plurality of antenna elements, each of said antenna elements operable to be programmed with a respective reflection coefficient;
   receiving microwave illumination at said antenna array from a microwave source;
   directing said microwave illumination towards a position on said target based on said respective direction coefficient associated with each of said antenna elements;
   receiving reflected microwave illumination reflected from said position on said target;
   measuring an intensity of said reflected microwave illumination to determine a pixel; and
   constructing an image including multiple pixel values associated with multiple positions on said target.

9. The method of claim 8, wherein said receiving said reflected microwave illumination further includes:
   blanket receiving said reflected microwave illumination reflected from said position on said target at a microwave receiver.

10. The method of claim 8, wherein said receiving said reflected microwave illumination further comprises:
    receiving reflected microwave illumination reflected from said position on said target at said antenna array; and
    directing said reflected microwave illumination reflected from said position on said target towards a microwave receiver based on a respective additional direction coefficient associated with each of said antenna elements.

11. The method of claim 8, wherein each said reflection coefficient represents a phase state of said respective antenna element.

12. The method of claim 8, wherein each said reflection coefficient represents an amplitude state of said respective antenna element.

13. A method for microwave imaging of a target, comprising:
    providing an antenna array including a plurality of antenna elements, each of said antenna elements operable to be programmed with a respective reflection coefficient;
    illuminating a position on said target with microwave illumination from a microwave source;

receiving reflected microwave illumination reflected from said position on said target at said antenna array;

directing said reflected microwave illumination reflected from said position on said target towards a microwave receiver based on said respective direction coefficient associated with each of said antenna elements;

measuring an intensity of said reflected microwave illumination to determine a pixel; and constructing an image including multiple pixel values associated with multiple positions on said target.

14. The method of claim 13, wherein said illuminating further includes: blanket illuminating said target with said microwave illumination.

15. The method of claim 13, wherein said illuminating further comprises:

receiving said microwave illumination from said microwave source at said antenna array; and directing said microwave illumination towards said position on the target based on a respective additional direction coefficient associated with each of said antenna elements.

16. The method of claim 13, wherein each said reflection coefficient represents a phase state of said respective antenna element.

17. The method of claim 13, wherein each said reflection coefficient represents an amplitude state of said respective antenna element.

18. A microwave imaging system, comprising:

a microwave source for providing microwave illumination;

an antenna array including a plurality of antenna elements, each of said antenna elements operable to be programmed with a respective reflection coefficient to direct said microwave illumination towards a position on a target, said antenna elements being further operable to be programmed to receive reflected microwave illumination reflected from said position on said target; and a processor operable to measure an amplitude of said reflected microwave illumination to determine a value of a pixel within an image of said target constructed by said processor.

19. A microwave imaging system, comprising:

a microwave source for providing microwave illumination;

an antenna array including a plurality of antenna elements, each of said antenna elements operable to be programmed with a respective reflection coefficient to direct said microwave illumination towards a position on a target, said antenna elements being further operable to be programmed to receive reflected microwave illumination reflected from said position on said target; and a processor operable to measure a phase of said reflected microwave illumination to determine a value of a pixel within an image of said target constructed by said processor.

20. A method for microwave imaging of a target, comprising:

providing an antenna array including a plurality of antenna elements, each of said antenna elements operable to be programmed with a respective reflection coefficient;

receiving microwave illumination at said antenna array from a microwave source;

directing said microwave illumination towards a position on said target based on said respective direction coefficient associated with each of said antenna elements;

receiving reflected microwave illumination reflected from said position on said target;

measuring an amplitude of said reflected microwave illumination to determine a value of a pixel; and constructing an image including multiple pixel values associated with multiple positions on said target.

21. A method for microwave imaging of a target, comprising:

providing an antenna array including a plurality of antenna elements, each of said antenna elements operable to be programmed with a respective reflection coefficient;

receiving microwave illumination at said antenna array from a microwave source;

directing said microwave illumination towards a position on said target based on said respective direction coefficient associated with each of said antenna elements;

receiving reflected microwave illumination reflected from said position on said target;

measuring a phase of said reflected microwave illumination to determine a value of a pixel; and constructing an image including multiple pixel values associated with multiple positions on said target.

* * * * *